(12) United States Patent
Pottjegort et al.

(10) Patent No.: US 10,740,118 B1
(45) Date of Patent: Aug. 11, 2020

(54) MONITORING MOBILE DEVICE USAGE

(71) Applicant: comScore, Inc., Reston, VA (US)

(72) Inventors: Thomas F. Pottjegort, Ashburn, VA (US); Michael A. Brown, Ashburn, VA (US)

(73) Assignee: comScore, Inc., Reston, VA (US)

( * ) Notice: Subject to any disclaimer, the term of this patent is extended or adjusted under 35 U.S.C. 154(b) by 322 days.

(21) Appl. No.: 15/429,917

(22) Filed: Feb. 10, 2017

Related U.S. Application Data

(60) Provisional application No. 62/293,502, filed on Feb. 10, 2016.

(51) Int. Cl.
| | |
|---|---|
| *G06K 9/62* | (2006.01) |
| *G06F 3/0481* | (2013.01) |
| *G06F 11/30* | (2006.01) |
| *G06F 11/34* | (2006.01) |
| *G06F 9/451* | (2018.01) |
| *G06T 7/73* | (2017.01) |
| *G06K 9/18* | (2006.01) |
| *H04L 29/08* | (2006.01) |

(52) U.S. Cl.
CPC .......... *G06F 9/451* (2018.02); *G06F 3/04817* (2013.01); *G06F 11/3089* (2013.01); *G06F 11/3438* (2013.01); *G06K 9/18* (2013.01); *G06K 9/6202* (2013.01); *G06K 9/6215* (2013.01); *G06T 7/74* (2017.01); *H04L 67/22* (2013.01); *G06T 2200/24* (2013.01)

(58) Field of Classification Search
CPC .... H04L 67/22; H04L 29/08675; G06F 11/34; G06F 11/3438; G06F 11/30; G06F 9/451; G06F 3/04817; G06F 11/3089; G06F 11/3096; G06T 7/74; G06T 2200/24; G06K 9/6215; G06K 9/6202; G06K 9/18; H04N 21/44222

See application file for complete search history.

(56) References Cited

U.S. PATENT DOCUMENTS

| | | | | |
|---|---|---|---|---|
| 8,171,406 | B1 * | 5/2012 | Newstadt | G06F 9/451 715/700 |
| 8,878,773 | B1 * | 11/2014 | Bozarth | G06K 9/00604 345/156 |
| 9,241,079 | B1 * | 1/2016 | Cai | H04M 15/885 |
| 9,292,694 | B1 * | 3/2016 | Valceanu | G06F 21/577 |
| 9,471,912 | B2 * | 10/2016 | Verkasalo | G06Q 30/0201 |

(Continued)

*Primary Examiner* — Kieu D Vu
*Assistant Examiner* — Blaine T. Basom
(74) *Attorney, Agent, or Firm* — BakerHostetler LLP

(57) ABSTRACT

A first image of a mobile device screen is recorded into memory of the mobile device. The first image includes at least one icon that represents an application installed on the mobile device. A second image of the mobile device screen is recorded into the memory of the mobile device. A graphical change in an area of the mobile device screen corresponding to a position of the icon is detected by comparing at least a portion of the second image to the first image. The graphical change results from a user selection of the icon to activate the application represented by the icon. In response to detecting the graphical change, determine an identifier of the application represented by the icon. Send a record of the user selection of the icon to a collection server. The record includes at least the identifier of the application.

12 Claims, 7 Drawing Sheets

(56) References Cited

U.S. PATENT DOCUMENTS

| | | | |
|---|---|---|---|
| 2009/0259745 A1* | 10/2009 | Lee | G06K 9/2072 |
| | | | 709/224 |
| 2013/0019171 A1* | 1/2013 | Mounty | G06F 11/3688 |
| | | | 715/704 |
| 2013/0080522 A1* | 3/2013 | Ren | H04L 12/6418 |
| | | | 709/204 |
| 2014/0155022 A1* | 6/2014 | Kandregula | G06Q 50/01 |
| | | | 455/405 |
| 2014/0325402 A1* | 10/2014 | Jung | G06F 3/0488 |
| | | | 715/763 |
| 2015/0032887 A1* | 1/2015 | Pesek | G06F 21/305 |
| | | | 709/224 |
| 2015/0332107 A1* | 11/2015 | Paniaras | G06F 3/016 |
| | | | 715/765 |
| 2017/0075910 A1* | 3/2017 | Soto Matamala | G06F 16/9537 |

* cited by examiner

Position: 13
App Name: Notes

FIG. 4

MONITORING MOBILE DEVICE USAGE

CROSS-REFERENCE TO RELATED APPLICATIONS

This application claims the benefit of U.S. Provisional Application No. 62/293,502, filed Feb. 10, 2016, the contents of which are hereby incorporated in its entirety.

BACKGROUND

Monitoring mobile device usage may be useful for a number of reasons. For example, a mobile application developer may want to be able to estimate the number of people who use its application on a daily basis and duration of each use. As another example, an organization may want to know how many users access the organization's web sites through their mobile devices and the demographic make-up of those users.

SUMMARY

Implementations of any of the described techniques may include a method or process, an apparatus, a device, a machine, a system, or instructions stored on a computer-readable storage device. One or more of the each component described above can be configured to perform particular operations or actions. One or more software programs can be configured to perform particular operations or actions by virtue of including instructions that, when executed by a data processing apparatus, cause the system to perform the actions. The details of particular implementations are set forth in the accompanying drawings and description below. Other features will be apparent from the following description, including the drawings, and the claims.

BRIEF DESCRIPTION OF THE DRAWINGS

FIG. 4 illustrates an example of detecting the selection of an icon and determining a corresponding application identifier.

DETAILED DESCRIPTION

In today's mobile-device driven computing environment, mobile device usage information can be used by content or service providers, advertisers, and others to determine characteristics and behaviors of the mobile users consuming their respective offerings. For example, a mobile game maker may want to understand the names and types of games most popular among a particular demographic group, and the amount of time an average mobile user spends playing each of those games. As another example, a social media service provider may want to gather information about how often people use its or its competitor's service in a given day and the duration of each session. As yet another example, an auto insurance carrier may want to be able to estimate how many potential customers browsed its web site for policy information through their mobile devices and how long they stayed on the web site. Further, the auto insurance carrier may also want to know how many of those potential customers visited a competitor's web site for information and the duration of those visits.

In some cases, mobile device usage characteristics may be calculated by observing the activities of a statistically significant number of mobile users that are representative of the population as a whole. These "panelist" users may provide information about themselves, such as their age, income, sex, or other information, and agree to have their mobile activities monitored. By observing the mobile device usage of the panelists and determining characteristics and behaviors for them, characteristics and behaviors for larger portions of the society can be inferred (within a certain margin of error based on the size of the panel relative to the size of the portion of the audience).

The following describes various techniques that may be employed to monitor mobile device usage. As one example, a prospective panelist may have a mobile device, such as a mobile phone, that can execute applications as well as communicate over one or more wired or wireless connections (e.g., GSM, Bluetooth, CDMA, or WiFi). An audience measurement entity may offer the prospective panelist a software application suitable to be executed on the panelist's mobile device and configured to collect and report information about the usage of the mobile device, while maintaining the panelist's privacy. Once the prospective panelist has been informed about the collecting and reporting functionality of the software application, the prospective panelist may accept the offer and install the software application on his or her mobile device, thereby becoming a consenting panelist. As the consenting panelist uses the mobile device, information about the usage may be collected and reported to a collection server. The information collected from multiple consenting panelists then may be used for gathering statistics of certain type of usage, such as mobile gaming or music playing or browser activity.

Figure 1A:
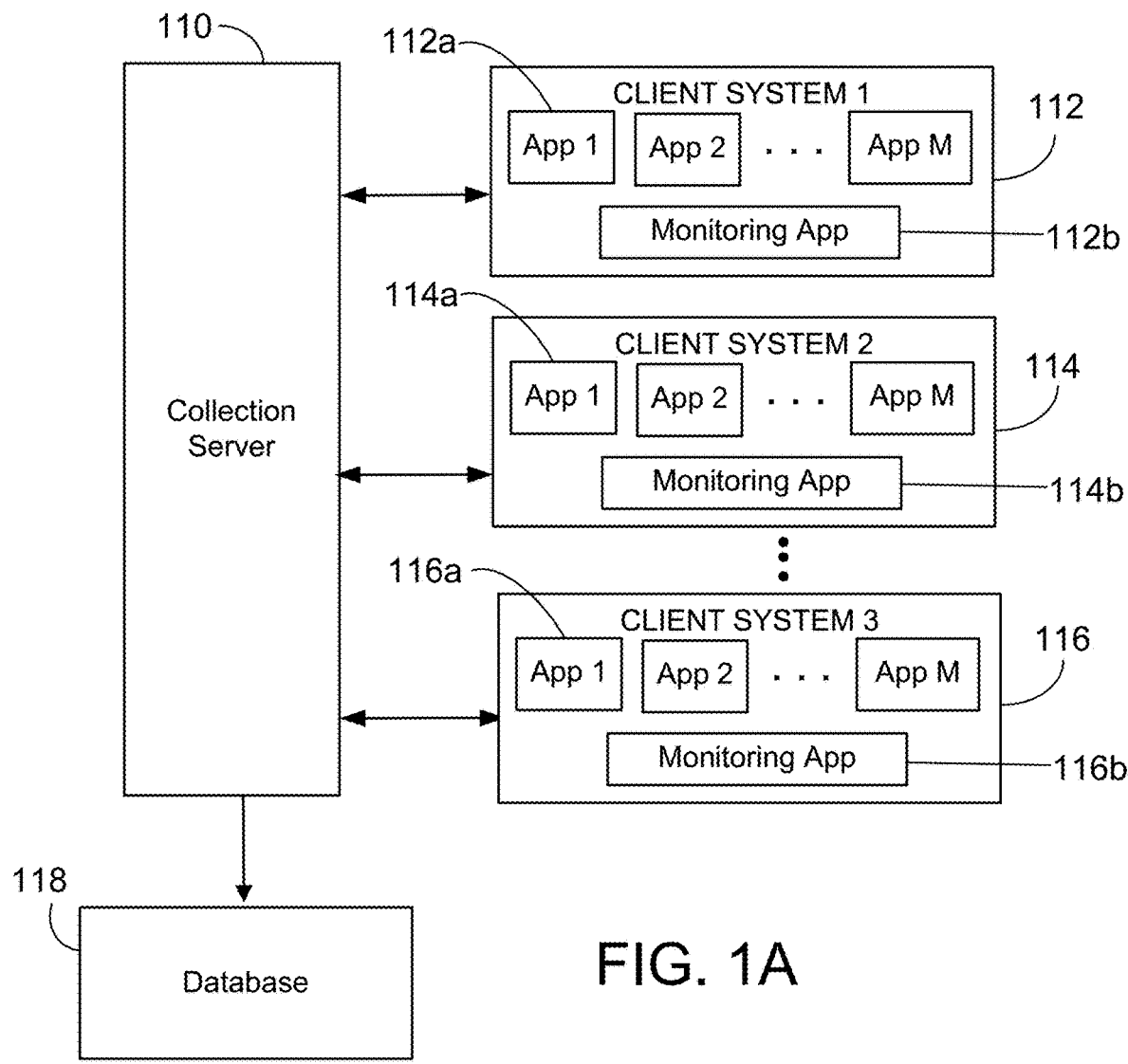
FIG. 1A is a block diagram of an example of a system in which a number of mobile devices may be used to perform mobile device usage measurement.

FIG. 1A illustrates an example of a system for monitoring the usage of a number of mobile devices whose owners have signed up as consenting panelists. The system 100 includes a collection server 110, mobile devices 112, 114, and 116, and a database 118. In general, the mobile devices 112, 114, and 116 are capable of executing user applications 112a, 114a, and 116a, which may include, as examples, games, web browsers, music players, or social media applications. The mobile devices 112, 114, and 116 are usually equipped with a touch screen that enables the user to launch an application through a click or tap of the corresponding application icon. In response to the click or tap, the mobile devices 112, 114, and 116 display a visual change on the screen, indicating to the user that the activation signal has been received. In some instances, the mobile devices 112, 114, and 116 may not have a touch screen, but there still will be a visual change as a result of an application launch.

In general, the mobile devices 112, 114, and 116 are capable of communicating over one or more wired or wireless connections (e.g., GSM, Bluetooth, CDMA, or WiFi) with the collection server 110. The collection server 130 may be implemented using, for example, a general-purpose computer capable of responding to and executing instructions in a defined manner, a personal computer, a special-purpose computer, a workstation, or a server. Mobile devices 112, 114, 116, and 118 and collection server 130 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by mobile devices 112, 114, 116, and 118 or collection server 130.

In the example shown in FIG. 1A, the system includes mobile devices 112, 114, and 118. In other implementations, however, there may be more or fewer mobile devices. Similarly, in the example shown in FIG. 1A, there is a single collection server 130. However, in other implementations there may be more than one collection server 110. For example, each of the mobile devices 112, 114, and 116 may send data to more than one collection server for redundancy. In other implementations, the mobile devices 112, 114, and 116 may send data to different collection servers. In this implementation, the data, which represents data from the entire panel, may be communicated to and aggregated at a central location for later processing. The central location may be one of the collection servers.

The owners of the mobile devices 112, 114, and 116 are a group of panelists that are a representative sample of the larger universe being measured, such as all mobile users in a geographic region, or all mobile users of a particular age group. To understand the overall behavior of the universe being measured, the behavior from this sample is projected to the universe being measured. The size of the universe being measured and/or the demographic composition of that universe may be obtained, for example, using independent measurements or studies.

The users in the panel may be recruited by an entity controlling the collection server 110, and the entity may collect various demographic information regarding the users in the panel, such as age, sex, household size, household composition, geographic region, and household income. The techniques chosen to recruit users may be chosen or developed to help insure that a good random sample of the universe being measured is obtained, biases in the sample are minimized, and the highest manageable cooperation rates are achieved. In some instances, financial or other benefits may be used to recruit users.

Once a user is recruited and has given consent, a monitoring application is installed on the user's mobile device. The monitoring application collects the information about the user's use of the mobile device and sends that information to the collection server 130. For example, the monitoring application may be configured to detect when a user application is launched and determine the duration the user application is active.

Thus, in system 100, a monitoring application 112*b*, 114*b*, and 116*b*, also referred to as a panel application, is installed on each of the mobile devices 112, 114, 116. The monitoring application 112*b*, 114*b*, and 116*b* includes instructions for monitoring and recording application launches on the mobile device 112, 114, or 116, and, for example, the duration the application is active, and for sending such information to the collection server 110. Accordingly, as a user uses the mobile device 112, 114, and 116, the monitoring application 112*b*, 114*b*, and 116*b* stores the launch records and transmit the records along with other relevant information (e.g., the timestamp of the launch, the timestamp of when the application went inactive, a mobile device identifier, duration the application is active, orientation of the device, an identifier of the application) over one or more communication paths to the collection server 110, which stores the received information in database 118. For instance, the monitoring application 112*b*, 114*b*, and 116*b* may use the cellular or Wi-Fi connection of the mobile device 112, 114, or 116 to communicate the records. The collection server 110 receives and records this information. The collection server 110 aggregates the recorded information and stores this aggregated information in the database 118 as panel centric data 120.

The panel data may be analyzed to determine the media consumption or other habits of users in the panel, which may be extrapolated to the larger population of all media users. The information collected during a particular time period (session) can be associated with a particular user possessing the mobile device and therefore his or her demographics.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member.

The usage behavior of the weighted and projected sample may then be considered a representative portrayal of the behavior of the defined universe. Behavioral patterns observed in the weighted, projected sample may be assumed to reflect behavioral patterns in the universe.

Estimates of usage or other behavior can be generated from this information. For example, this data may be used to estimate the average duration an application is active, the percentage of particular demographic that uses an application versus a corresponding website (for example, the percentage of males that use the Facebook application alone, the percentage that use the Facebook website, and the percentage that uses both).

Figure 1B:
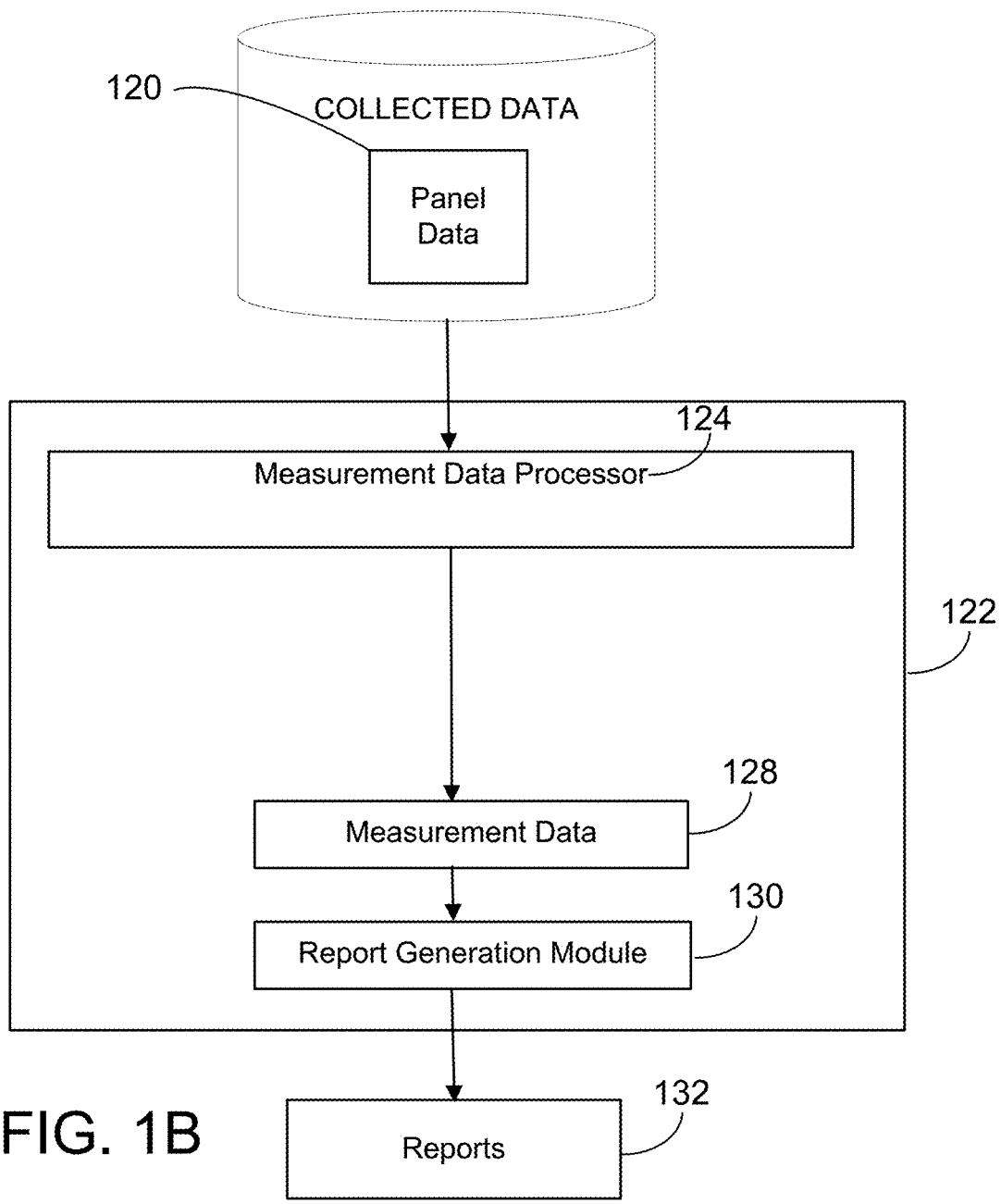
FIG. 1B illustrates a collection server system in which the panel data can be used to generate measurement data.

FIG. 1B illustrates an example of a collection server system in which the panel data 120 can be used to generate measurement data 128. The system includes a reporting server 122. The reporting server 122 may be implemented using, for example, a general-purpose computer capable of responding to and executing instructions in a defined manner, a personal computer, a special-purpose computer, a workstation, a server, or a mobile device. The reporting server 122 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 122.

The reporting server 122 executes instructions that implement a measurement data processor 124 and a report generation module 130. The measurement data processor 124 is configured to examine the application launch records together with other relevant information in the panel data 120 to generate measurement data 128. For example, the measurement data processor 124 may determine a panelist associated with a mobile device activated a particular application at a certain time, and continued to have it active for a certain duration. The measurement data processor 124 may then assemble the information from each panelist into data that reflect the panelists' pattern of mobile activities, and project such information to the universe of interest. Additionally, the measurement data processor 124 may combine the application launch information with the demographic characteristics of the panelists. The report generation module 130 may use the measurement data 128 to generate one or more reports 132 that include information regarding the launch of one or more mobile device resources such as mobile applications.

Figure 2:
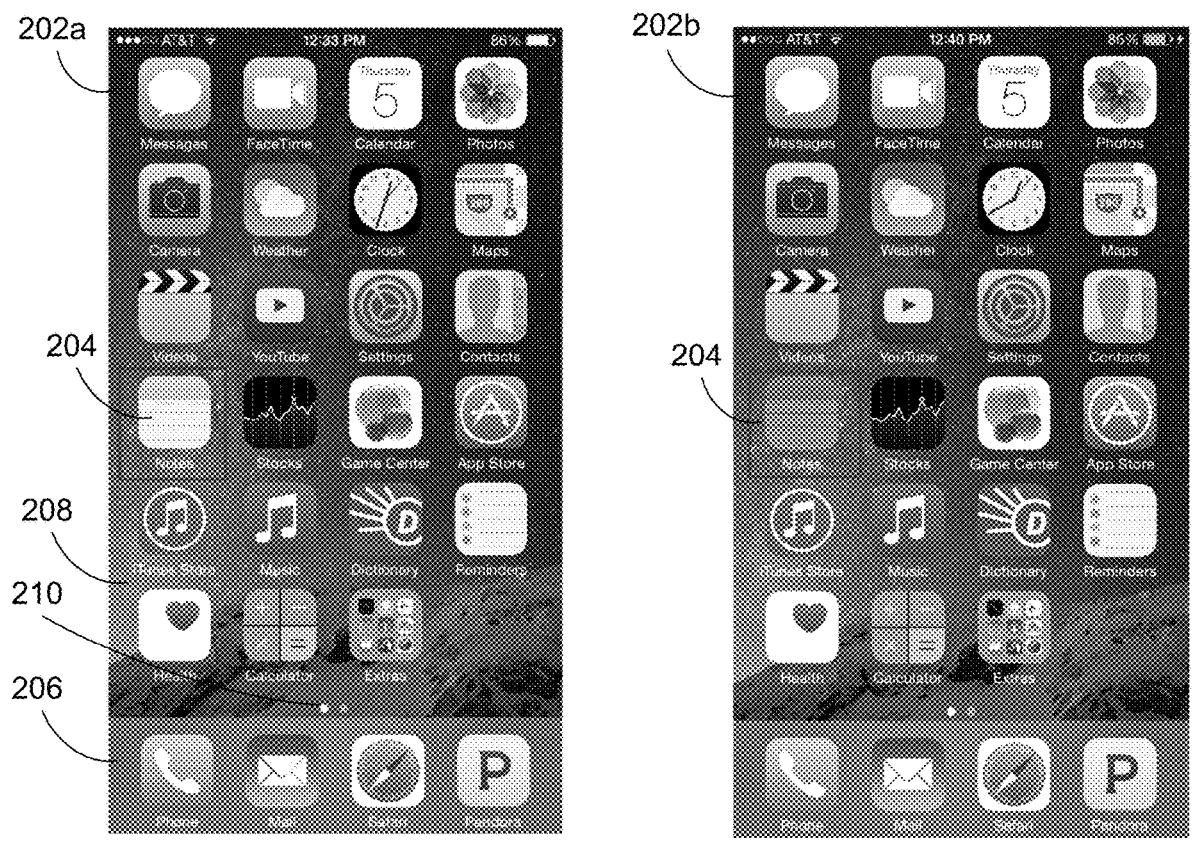
FIG. 2 illustrates an example of a graphical change on a mobile device home screen caused by the launch of an application.
Figure 3:
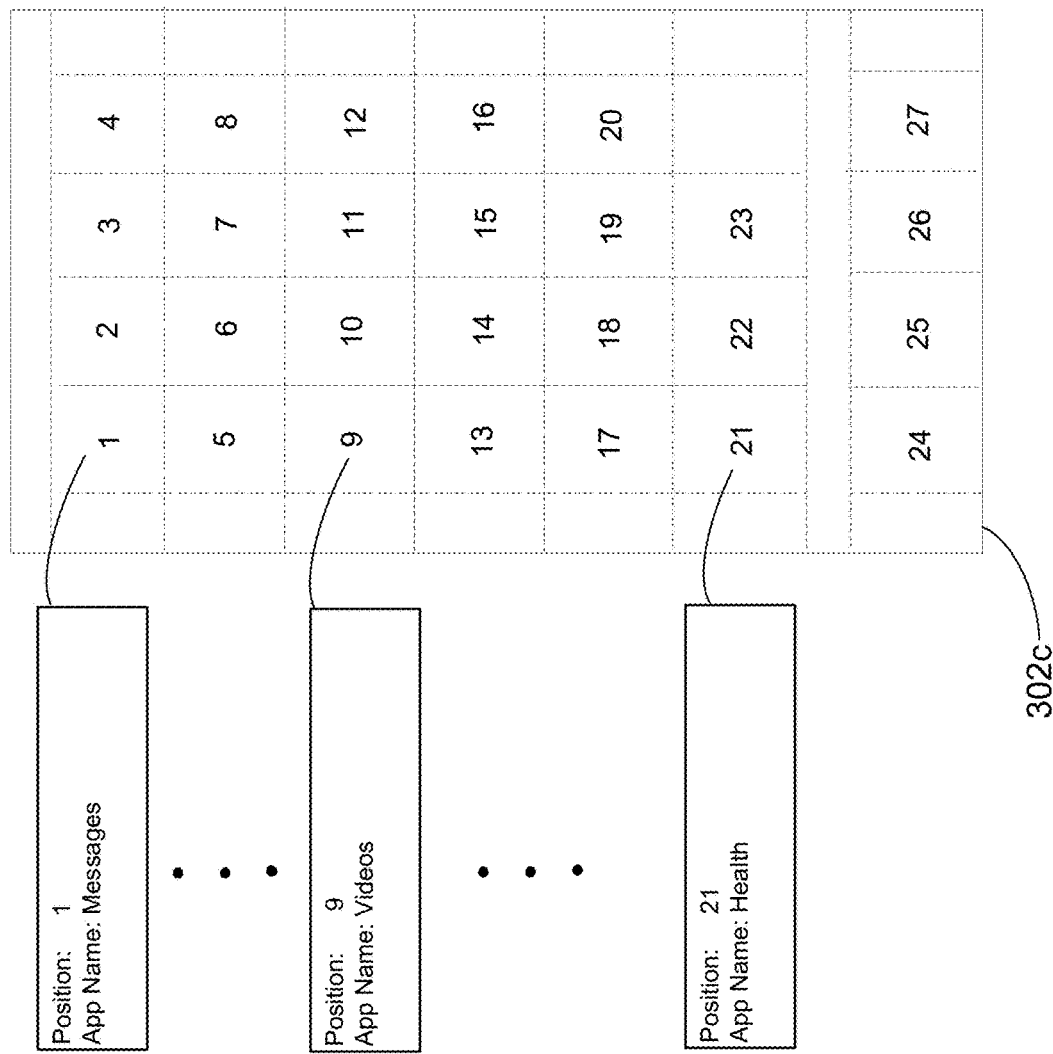
FIG. 3 illustrates an icons located on a home screen according to a particular layout.
Figure 3:
Figure 4:
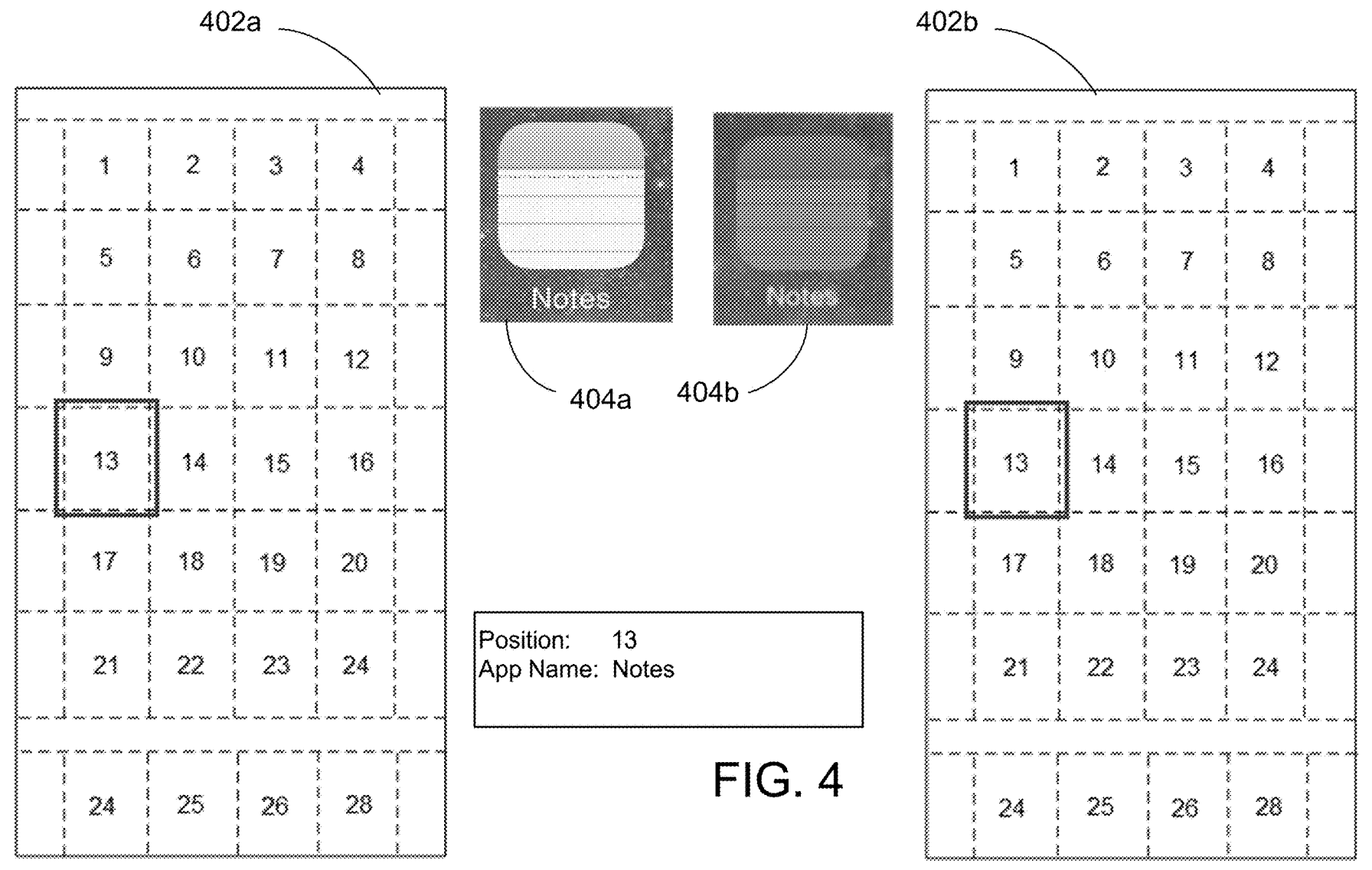

FIGS. 2 to 4 illustrate examples of techniques that may be used by the monitoring application to detect the launch of an application. In this implementation, the monitoring application is responsible for rapidly recording images of the mobile device's home screen into the memory of the mobile device and comparing consecutively recorded images to detect a graphical change indicating that the mobile device user has launched an application. The monitoring application then determines an identifier for the launched application, as well as other information such as the duration the application was active, and transmits that information for analysis.

FIG. 2 illustrates an example of a graphical change on a mobile device home screen caused by the launch of an application. A first screenshot 202a illustrates a mobile device's home screen at a first time when no application is being activated in the foreground. A red rectangle is drawn to highlight the screen area where the application icon 204a for "Notes" is located. A second screenshot 202b illustrates the mobile device home screen at a second time immediately after the application icon 204 for "Notes" was tapped or pressed, but before the application launched. A similar red rectangle is drawn in the same screen area to highlight the screen area where the application icon 204 for "Notes" is located. As depicted, the application icon 204 remains in the same location, but undergoes a graphical change. In the particular example shown, the application icon 204 darkens or becomes "grayed out."

By programmatically capturing and comparing the before and after images of the mobile device home screen surrounding an application launch, the monitoring application can, for example, detect the occurrence of each application launch on the mobile device. Further, by continuing to capture and compare images of the mobile device screen, other activity can be detected or information determined. For example, the duration the application is active and displayed may be determined. This may be accomplished by analyzing the recorded images to detect the user closing or otherwise navigating away from the application, for instance, by detecting the transition to a type of screen that is displayed when applications are closed or switched and therefore no longer displayed. For example, in iOS, the home screen, the lock screen, or the selector screen may be detected since those are the screens that are displayed when an application is closed or switch. These screens may include unique characteristics that can be detected by analyzing the captured images. For instance, the home screen may include a lower launch portion 206 with a different background color than the upper portion 208 that includes a grid of icons. Further, a series of dots 210 divide the upper portion 208 from the lower portion 206. The captured images can be analyze detect such characteristics to determine when the home screen is display. The lock screen may likewise include unique characteristics such as a battery icon in a particular location or an icon indicating particular cellular service. The selector screen may have a representations of the running applications and associated icons displayed in a particular layout, which can be detected by analyzing the captured images.

Various screen capture techniques can be employed to enable the monitoring application to record images of the mobile device screen. For example, Android Screenshot Library (ASL) includes functions that can be used to programmatically capture screenshots from an Android application. Other operating systems may provide Application Programming Interfaces (APIs) that can be used to capture screenshots.

Other techniques may be used for programmatically capturing images of the mobile device screen. For example, an external camera can be used to record the screen or some operating systems may allow the frame buffer to be accessed (and therefore the screen image). As another example, some devices may provide screencasting capabilities, which allow the screen of the mobile device to be mirrored on an external display. To provide such capability, the operating system may provide a client screencast application that captures the mobile device's display and streams the captured display to a server screencast application, typically located on a device connected to the external display. When such screencasting capability is provided, the monitoring application may run a local (that is, on the mobile device) server screencast application that connects to the client screencast application to receive the screencast stream and therefore detect changes in the images of the display. In some cases, such an implementation may be more efficient than using an API to capture screenshots since the screencasting capability may be hardware accelerated. In addition, the client screencast application may produce the screencast stream by using compression on the display data that determines the differences between frames of the display, and transmits those differences. As a result, less data may need to be analyzed to determine differences between sequential frames, or screenshots, of the display.

FIG. 3 illustrates an icons located on a home screen according to a particular layout. As shown in screenshot 302a, multiple icons are arranged according to a layout defined by the mobile device for the position of each of the icons. For example, as illustrated, the layout may include a table grid 302c of 7 rows and 4 columns, with a total of 28 cells each preserved for an application icon and associated graphical text of the applications name.

When the icons are arranged according to a defined layout, it may be possible to detect a graphical change on the home screen as indication of an application launch without examining all pixels of the screen. Accordingly, in some implementations, the monitoring application first determines where each application icon is located on the home screen and then only checks those relevant locations of the screenshots for graphical changes.

For instance, the detection of the graphical change may involve first determining the layout of icons based on the characteristics (e.g., screen size, resolution, etc.) of the mobile device, and then identifying the positions of the icons using the determined layout. For example, an operating system API may be called to determine the characteristics and the monitoring application may include a table of corresponding layouts based on those characteristics, or may include an algorithm for determining the current layout from those characteristics based on baseline layout. Upon determining the layout of the home screen, the mobile application proceeds to compare at least a portion of the pixels in each cell area to identify the specific application icon located therein. For instance, a vertical or horizontal stripe of pixels equal to the height or width, respectively, of icons or cells may be compared between the images. If there is a change in color of some or all of the pixels in the stripes, then the corresponding icon may be considered as being selected by the user to activate the application represented by the icon Once the layout of the mobile device screen is determined, the monitoring application in some implementations engages in repetitive loop of recording and comparing consecutive images of the mobile device screen to determine whether a graphical change has occurred. FIG. 4 illustrates how this can be accomplished consistent with one implementation.

FIG. 4 illustrates an example of detecting the selection of an icon and determining a corresponding application identifier. In FIG. 4, the monitoring application has recorded two images of the mobile device home screen into the memory of the mobile device, namely, a first image 402a and a second image 402b. The first image 402a is recorded a time prior to the second image 402b.

The monitoring application then examines at least a portion of the pixels (e.g., a vertical or horizontal stripe) at each icon position in the first image against those at the same icon position in the second image to detect any changes. For example, icon 404a at icon position 13 in the first image 402a represent the appearance of the screen area when the corresponding application icon is not pressed. By contrast, icon 402b at icon position 13 in the second image represent the appearance of the same screen area when the corresponding application icon is pressed. The monitoring application is capable of detecting the graphical changes in the screen area by comparing the digital representation of the graphical attributes (e.g., color, shade, etc.) of each pixel in icon position 13 in the first image against that of the same pixel in the same icon position in the second image. Accordingly, a determination can be made that the application at icon position 13 was activated at the time the second image was recorded.

In some implementations, the monitoring application proceeds to determine the identifier of the application at the position of the graphical change. In the present example, the monitoring application determines that the name of the application at icon position 13 is "Notes." In some implementations, this can be accomplished by detecting the name of the application represented by the icon. By way of an example, machine-encoded text recognition techniques such as Optical Character Recognition (OCR) can be used to determine the application name based on the graphical text located at a defined position relative to the icon. In the present example, using OCR techniques, the graphical text "Notes" is converted to machine-encoded text that is used as the application identifier.

The monitoring creates a record of the application launch event in the memory of the mobile device that includes at least information about the identifier of the application being launched and the time of the event as reflected by the timestamp of the second recorded image. In some implementations, the monitoring application proceeds to send the record to the collection server right away for analysis. In some other implementations, the monitoring application accumulates the records in the mobile device memory and send them together periodically to the collection server. For instance, to conserve cellular bandwidth, the monitoring application may decide to send the records only when WiFi connection to the collection server becomes available.

Furthermore, a hash of at least a portion of the pixels used in the comparison may be sent with the record that contains the application identifier. For example, if a vertical or horizontal stripe of pixels is used in the comparison, a hash of the stripe may be created and included with the record. This may allow, for example, for applications to be identified on the collection server when an application identifier sent with a record is incorrect or unreadable. For example, when OCR techniques are used, the process may fail to create machine-encoded text or the machine-encoded text may not be created accurately. In that case, the application identifier is incorrect. However, a comparison of the included hash to earlier hashes that have been received with correct application identifiers may nevertheless allow the identity of the application to be identified.

If after comparing the two consecutively recorded images of the mobile device home screen the monitoring application detects no graphical change, it may discard the first image to free up memory space. Regardless, the second image forms a new basis for the next iteration of comparison.

In some implementations, the monitoring application is capable of detecting not only graphical changes on the home screen for purposes of determining application launches but also of identifying useful information in a recorded image of the mobile device screen while an application is running. For example, in those implementations, the monitoring application can determine, based on a recorded image of the mobile device screen, a browser application is running on the mobile device and thereby apply the machine-encoded text recognition techniques described above to detect the URL of the web site being visited. The monitoring application can maintain a log of such web activities and send it to the collection server for analysis.

Figure 5:
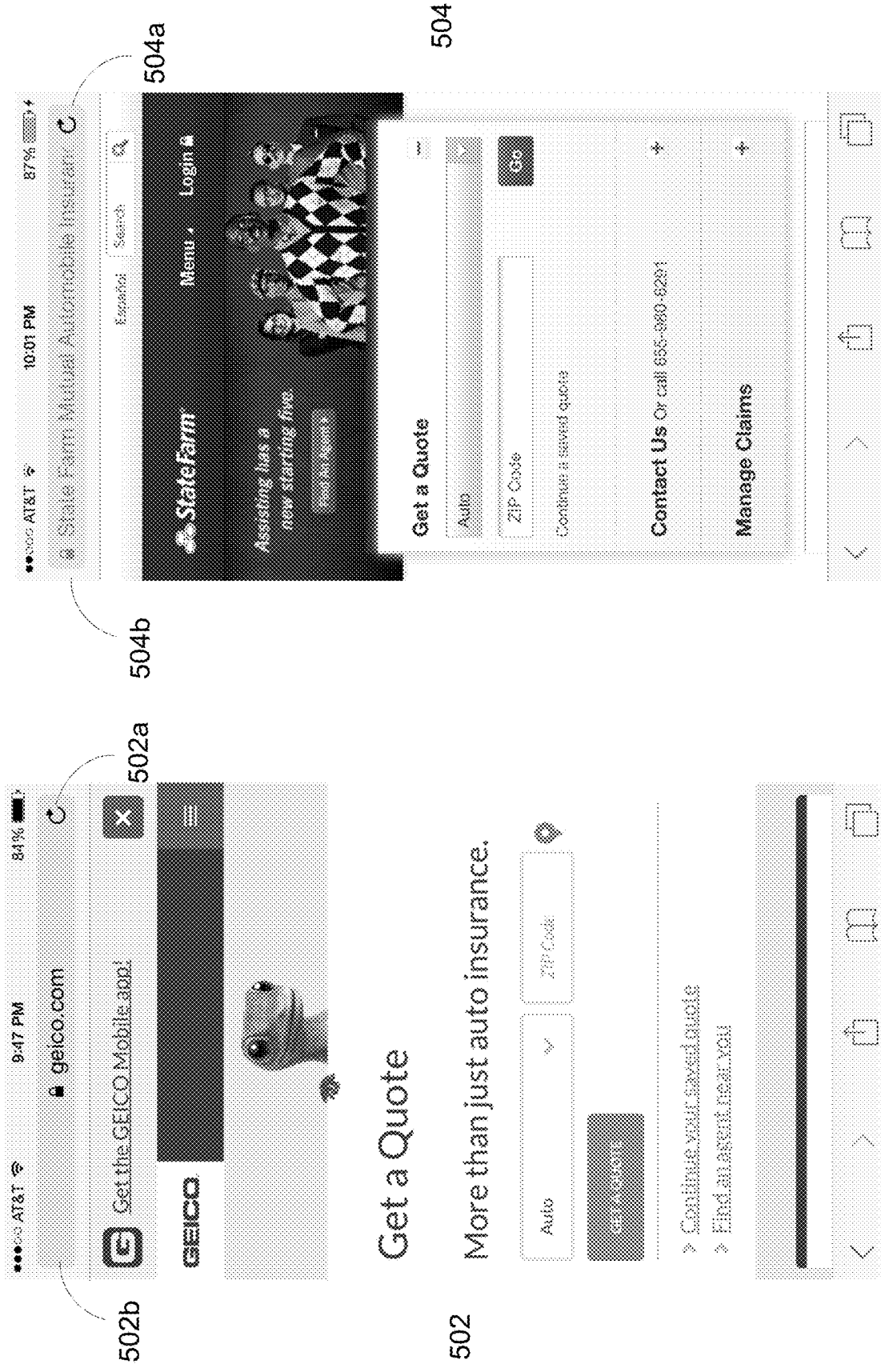
FIG. 5 illustrates an example of tracking web activities by analyzing images of the mobile device screen.

FIG. 5 illustrates an example of tracking web activities by analyzing images of the mobile device screen recorded while a browser application is running. Here, two images 502 and 504 of the mobile device screen have been taken, using similar screen capture techniques as described above. The monitoring application can determine that the images represent a browser activity as opposed to the home screen by identifying graphical characteristics that are unique to a browser screen. By way of examples, these characteristics may include the refresh button 502a and 504a and the address bar 502b and 504b.

Upon determining that the images 502 and 504 represent the mobile device screen with a running instance of a browser application, the monitoring application examines the content of the images to further determine the URL of the web site visited. In some implementations, the same machine-encoded text recognition techniques described under FIG. 3 can be used to extract the URL information based on the graphical text located at the address bar 502b and 504b. For instance, the monitoring application may analyze images to detect the refresh button 502a, and then extract and perform OCR on the text at a defined position relative to the refresh button 502a to determine the URL. Unique characteristics of an URL string may be used to ensure accuracy. For example, the presence of the letters "www" or ".com" or a format of "www.website.com" provides further assurance that the text presents an URL. The monitoring application may continue to monitor the text between images, and when the text changes, determine the duration that the web page corresponding to the first URL was displayed.

In the present example, the monitoring application is able to determine that the mobile user visited Geico's website at the time the URL "geico.com" was first present and then navigated away at the time that the "State Farm Automobile Insurance" text was first present, and, from that information, determine the duration the Geico website was displayed.

In some implementations, the monitoring application sends the detected web activity immediately upon its identification to the collection server for analysis. Alternatively, the monitoring application may maintain a log of such web activities in the memory of the mobile device and send the log to the collection server on a periodic basis.

In some implementations, the foregoing techniques for detecting web activities are used to identify advertisements visible on the mobile device screen while a particular application is running. For example, the captured images can be analyzed to detect icons that conform to a standard size, such as those defined by the Internet Advertising Bureau. Alternatively, or in addition, a signature, such as a hash, of an advertisement may be compared with hashes created from portions of a captured image to detect advertisements in the captured image. Alternatively, or in addition, specific makers may be added to advertisements that may be detected by analyzing the captured images. For instance, patterns of dots may be included that are not visible to the human eye, but that could be recognized through image processing techniques.

More generally, the described techniques can be used to detect user activities in web pages or applications. For example, captured images can be analyzed to detect changes in the images that correspond to user activities. For example, when a user selects a hyperlink in a web page or application, that hyperlink may become highlighted. This change can be detected to determine that the user selected the hyperlink. Further, OCR can be performed to determine the text associated with the hyperlink. In general, buttons or other user interface elements in a web page or application may exhibit a visual change to indicate that they have been selected or that the user has otherwise interacted with them or an associated element of the web page or application. This visual change may be detected by analyzing the captured images to determine user activity, and OCR may be performed on associated text as appropriate to derive additional information. For instance, analyzing captured images related to a social networking application may be used to detect that user has added friends consumed items and to derive metrics like how many friends were added or items consumed.

Figure 6:
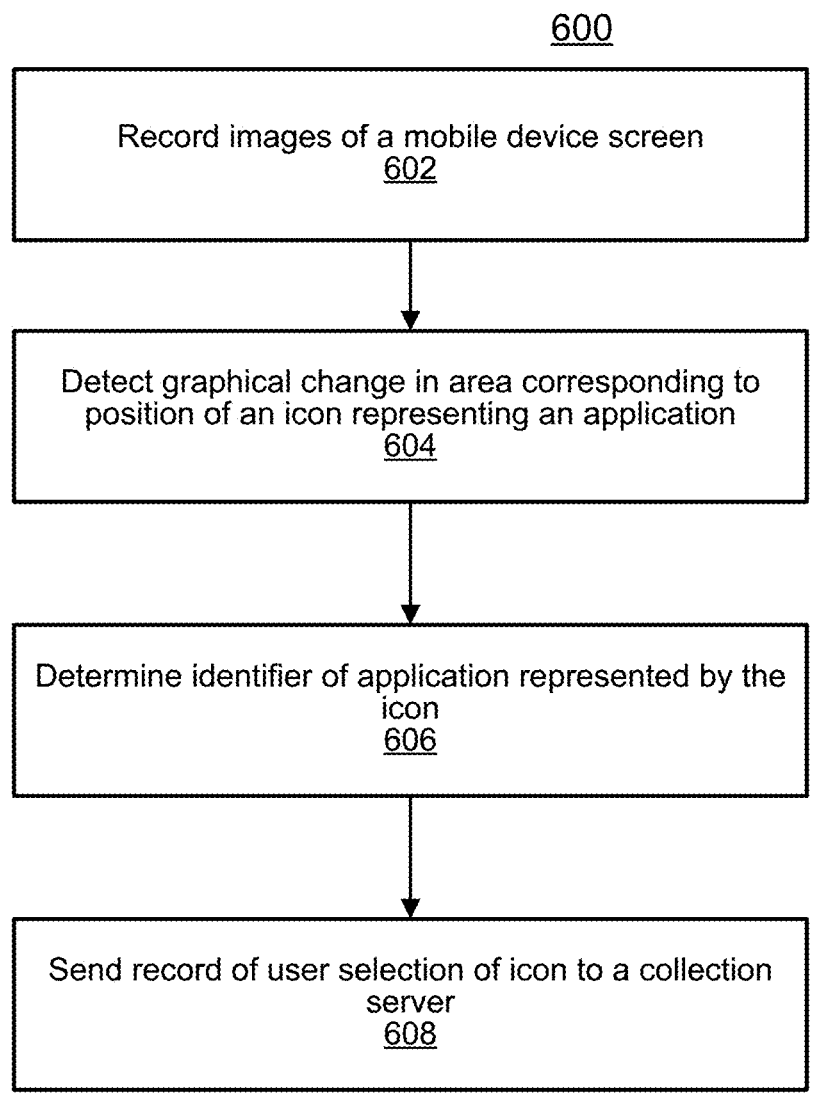
FIG. 6 is a flow chart illustrating an example of a process 600 for detecting application launches.

FIG. 6 is a flow chart illustrating an example of a process 600 for detecting application launches. Images of a mobile device screen are recorded, for example, on the mobile device (602). For instance, a first image of a mobile device screen and a subsequent, second image of the mobile device screen are recorded into memory of the mobile device. The first image includes, for example, at least one icon that represents an application installed on the mobile device. For example, the first image may have been captured while the user was on the home screen of the device, and the home screen of the device may include, for instance, a grid of icons, at least some of which represent applications.

A graphical change in an area of the mobile device screen corresponding to a position of the icon is detected by comparing at least a portion of the second image to the first image (604). The graphical change being detected may result from a user selection of the icon to activate the application represented by the icon. For example, the first image may include multiple icons arranged according to a layout that defines a position of each of the icons. The particular layout of the icons may vary based on certain characteristics of the mobile device, such as screen size or resolution. The characteristics of the device may be detected, and the particular layout may be determined based on the characteristics. The particular positions of the icons then may be determined using the determined layout. Based on the determined positions of the icons, at least some pixels at the position of each icon in the first image may be compared to corresponding pixels at the position of each icon in the second image to detect the graphical change. For instance, a vertical or horizontal stripe of pixels equal to the height or width, respectively, of icons in the layout may be compared between the images. If there is a change in color of some or all of the pixels in the stripes, then the corresponding icon may be considered as being selected by the user to activate the application represented by the icon.

In response to detecting the graphical change, an identifier of the application represented by the icon is determined (606). For example, the names of the applications may be included as graphical text on the mobile device screen under the corresponding icons. When an icon is detected as being selected by a user, optical character recognition may be performed on the graphical text under the icon to determine machine-encoded text of the application name. This machine-encoded text may be used as the identifier of the application particular if application names are unique on the mobile device.

In some cases, starting from a home screen, a user may first select an icon that represents a folder that includes icons representing applications. In this case, analysis of the subsequent images may indicate that a folder was selected. For example, the folder icon may include a name in the form of graphical text located at a defined position relative to the folder icon, such as below the folder icon. As part of the process described above, optical character recognition may be performed on the graphical text corresponding to this name to produce machine-encoded text of the name. When the folder icon is selected, the screen may change to show icons corresponding to applications positioned according to a particular layout for folders, with the folder name in the form of graphical text located at a defined position relative to the icons. Optical character recognition may be performed on the area in which the graphical text is located when a folder is detected and, if the graphical text is in fact located in that position, the optical character recognition will produce machine-encoded text. That machine-encoded text can then be compared to the machine-encoded text produced as a result of the selection of the folder icon. If those match, then the previous selection may be recorded as a selection of a folder icon. Further screen comparisons may then use the icon layout for folders when comparing at least some pixels at the position of each icon in the first image to corresponding pixels at the position of each icon in the second image to detect the graphical change and, when detected, the identifier of the application is determined.

A record of the user selection of the icon is sent to a collection server (608). The record includes at least the identifier of the application. For example, the record may be sent immediately after determining the application identifier, and include, for example, the application identifier, a time stamp, and a device identifier. Alternatively, the record may be sent after analyzing one or more subsequent images to insure that the icon represented an application rather than a folder.

In some cases, the duration that the application was displayed on the screen may be measured. For example, after a selection of an application icon is detected, the recorded images of the mobile device screen may be analyzed to detect the user closing or otherwise navigating away from the application, for instance, by detecting the transition to the home screen, the lock screen, or the selector screen may be detected.

Once the user closes or otherwise navigates away from the application, the duration the application was on-screen may be determined, for example, by comparing a timestamp at the time the user selected the application icon to a timestamp at the time the user closed or otherwise navigated away from the application. At this point a record may be sent to the collection server and may include, for example, the identifier of the application, the duration, a time stamp, and a device identifier. This record may be in addition to or as an alternative to a record immediately after detecting the selection of the application icon. If both records are sent and include time stamps, then the time stamps may be used by the collection server to also determine a duration.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. A method for determining user interaction with applications on a mobile device, the method comprising:
    recording a first image of a mobile device screen at a first time, the first image including a first area with an icon that represents an application installed on the mobile device;
    recording a second image of the mobile device screen at a second time that is after the first time, the second image including a second area with the icon that represents the application installed on the mobile device, the second area being the same as the first area in the mobile device screen;
    recording a third image of the mobile device screen at a third time that is after the second time;
    detecting a change in brightness between the first area and the second area by comparing pixels of the second area to pixels of the first area, the change in brightness resulting from a user selection of the icon to activate the application represented by the icon;
    in response to detection of the change in brightness, determining an identifier of the application represented by the icon;
    determining that the third image corresponds to a type of screen that is displayed when applications are no longer displayed on the mobile device; and
    determining a duration that the application represented by the icon was displayed based on the difference between the third time and the second time.

2. The method of claim 1, further comprising:
    creating a first hash of the pixels in the first area of the first image; and
    creating a second hash of the pixels in the second area of the second image.

3. The method of claim 1, wherein determining the identifier of the application represented by the icon comprises determining machine-encoded text based on graphical text located at a defined position relative to the icon.

4. The method of claim 1, further comprising:
    recording a fourth image of the mobile device screen;
    detecting a characteristic of a web browser in the fourth image; and
    in response to detection of the characteristic of the web browser, determining a uniform resource locator corresponding to a web page displayed by the web browser.

5. The method of claim 4, wherein determining the uniform resource locator corresponding to the web page displayed by the web browser comprises performing optical character recognition on graphical text located at a defined position relative to the characteristic of the web browser.

6. The method of claim 1, further comprising:
    recording a fourth image of the mobile device screen; and
    detecting an advertisement visible on the mobile device in the fourth image.

7. A system for determining user interaction with applications on a mobile device, the system comprising at least one processor and at least one memory storing a software application that causes the mobile device or a collection server to:
    record a first image of a mobile device screen at a first time, the first image including a first area with an icon that represents an application installed on the mobile device;
    record a second image of the mobile device screen at a second time that is after the first time, the second image including a second area with the icon that represents the application installed on the mobile device, the second area being the same as the first area in the mobile device screen;
    record a third image of the mobile device screen at a third time that is after the second time;
    detect a change in brightness between the first area and the second area by comparing pixels of the second area to pixels of the first area, the change in brightness resulting from a user selection of the icon to activate the application represented by the icon;
    in response to detection of the change in brightness, determine an identifier of the application represented by the icon;
    determine that the third image corresponds to a type of screen that is displayed when applications are no longer displayed on the mobile device; and
    determine a duration that the application represented by the icon was displayed based on the difference between the third time and the second time.

8. The system of claim 7, wherein the software application causes the mobile device to:
    create a first hash of the pixels in the first area of the first image; and
    create a second hash of the pixels in the second area of the second image.

9. The system of claim 7, wherein to determine the identifier of the application represented by the icon, the software application causes the mobile device to determine machine-encoded text based on graphical text located at a defined position relative to the icon.

10. The system of claim 7, wherein the software application causes the mobile device to:
    record a fourth image of the mobile device screen;

detect a characteristic of a web browser in the fourth image; and in response to detection of the characteristic of the web browser, determine a uniform resource locator corresponding to a web page displayed by the web browser.

11. The system of claim 10, wherein to determine the uniform resource locator corresponding to the web page displayed by the web browser, the software application causes the mobile device to perform optical character recognition on graphical text located at a defined position relative to the characteristic of the web browser.

12. The system of claim 7, wherein the software application causes the mobile device to:

record a fourth image of the mobile device screen; and detect an advertisement visible on the mobile device in the fourth image.

\* \* \* \* \*